United States Patent Office 3,528,953
Patented Sept. 15, 1970

3,528,953
TRIALKYL TIN FLUORIDES AS CATALYST ADDI-
TIVES IN BUTADIENE POLYMERIZATION
Morford C. Throckmorton, Akron, Ohio, assignor to The
Goodyear Tire & Rubber Company, Akron, Ohio, a
corporation of Ohio
No Drawing. Filed Oct. 10, 1967, Ser. No. 674,113
The portion of the term of the patent subsequent to
Apr. 15, 1986, has been disclaimed
Int. Cl. C08f 1/56
U.S. Cl. 260—82.1                                  7 Claims

ABSTRACT OF THE DISCLOSURE

A method and a catalyst system for the solution polymerization of butadiene and/or butadiene in mixture with other diolefins to form polymers containing a high content of cis 1,4 addition is described. The solution polymerization is carried out under conventional polymerization conditions. The catalyst employed is a mixture of (1) organometallic compounds of metals of Groups I, II and III; (2) at least one compound selected from the class consisting of organonickel and organocobalt compounds and (3) a trialkyltin fluoride.

---

This invention is directed to a method of polymerizing butadiene and/or butadiene in mixture with other diolefins to form polymers containing a high content of cis 1,4 addition. It is also directed to a catalyst system useful for this purpose.

Certain processes are known to prepare high cis 1,4 polybutadiene which show good processability. For instance, it is known that polybutadiene can be produced by polymerizing butadiene with a catalyst system comprising (1) triethylaluminum, (2) organonickel salt and (3) a boron trifluoride·diethylether complex. Such polybutadiene possesses a very high cis 1,4 molecular structure, about 98% and exhibits excellent mechanical processability as indicated by rubber factory processing operations.

The processability of the polymers produced by the ternary catalyst system of this invention are equivalent to the polymers produced by the previously described prior art polymerization system.

According to the present invention, butadiene or butadiene in combination with other diolefins is polymerized by contact under solution polymerization conditions by means of a catalyst comprising (1) at least one organometallic compound in which the metal is selected from Groups I, II and III of the Periodic System, (2) at least one organometallic compound selected from the class consisting of organonickel and organocobalt compounds and (3) at least one trialkyltin fluoride.

In addition to producing polymers possessing equivalent processing properties, the present invention exhibits unexpected versatility in certain other polymerization characteristics. These important polymerization characteristics are quite unexpected.

The catalyst system of this invention normally produces polymers having relatively high molecular weights as determined by dilute solution viscosity (DSV). Dilute solution viscosity is an accepted indication of molecular weight in the synthetic rubber art.

The practice of this invention has been found to be unique in that the DSV of the polymers produced by the catalyst system of this invention increases with increased amounts of the trialkyltin fluoride catalyst component being employed, whereas in the previously described prior art process, the DSV of the polymers there produced decreases with additional amounts of the BF₃·diethyl ether complex being employed.

Also, the present invention is unique in that the DSV of the polymers produced decreases sharply with an increase in polymerization temperature, thus, providing a convenient means for molecular weight control. This too, is in contrast with the previously described prior art process. Another feature where the present invention differs from the prior art is in the flexibility of various catalyst components which it is possible to use. For example, the catalyst system just mentioned using the boron trifluoride·diethyl ether complex appears to be quite limited with respect to the selection of the trialkylaluminum component if optimum reaction rates for this system are to be attained. To maintain the optimum reaction rate with this catalyst system, the choice of trialkylaluminum compound appears to be limited to trimethylaluminum and triethylaluminum. When the ethyl group in the trialkyluminum compounds is replaced with longer chain alkyl groups, for example, n-propyl or isobutyl, not only is the polymerization reaction rate of this system appreciably reduced, but the molecular weight of the resulting polymer decreases below desirable values. The decline in reaction rate and polymer properties is particularly sharp when the triethylaluminum is replaced with diisobutyl aluminum hydride, triisobutylaluminum and/or organoaluminum compounds containing even longer branched-chain alkyl groups than the isobutyl group.

In contrast, the catalyst system of the present invention is much more versatile than the aforementioned system with respect to the selection of the trialkylaluminum compound. Various trialkylaluminum or dialkylaluminum hydrides (as indicated by the specific embodiments herein) can be used in the catalyst system of this invention without affecting the rapid polymerization, the high yield, or the desirable polymer viscosities characteristic of the system.

The organometallic compounds wherein the metals are selected from Groups I, II and III of the Periodic System are organocompounds of such metals as lithium, sodium, potassium, rubidium, cesium, magnesium, calcium, strontium, beryllium, barium, zinc, cadmium, mercury, aluminum, gallium and indium. The term "organometallic," as used here to refer to compounds, indicates that metals of Groups I, II and III of the Periodic System are attached directly to a carbon atom of alkyl, cycloalkyl, aryl, arylalkyl and alkaryl radicals. All of the above compounds may be used in the practice of this invention.

When considering the organometallic compounds containing metals from Groups I, II and III, it is preferred for this invention to use organoaluminum compounds, organomagnesium compounds, organozinc compounds and organolithium compounds.

By the term "organoaluminum compound" is meant any organoaluminum compound responding to the formula

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride, and diphenylaluminum fluirode. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, and other organoaluminum hydrides. Also included are diethylethoxyaluminum and dipropylethoxyaluminum. Also included are trimethylaluminum, triethylaluminum, tri-n-propylaluminum, triisopropylaluminum, tri - n - butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first any organomagnesium complex responding to the formula $R_aMgX_b$ where R may be alkyl, aryl, arylalkyl or alkaryl; X is a halogen and $a$ and $b$ are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also "organomagnesium compounds" means any organomagnesium compound or any organomagnesium halide of the Grignard type corresponding to the formulas $R_2Mg$ or $RMgY$ where R may be alkyl, aryl, arylalkyl or alkaryl and Y is fluorine, or $R'R''Mg$ where R' may be alkyl, aryl, or alkaryl and R'' may be either alkyl, aryl, arylalkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R may be alkyl, aryl, alkaryl or arylalkyl. Representative among such compounds are diethylzinc, dibutylzinc or diphenylzinc.

By the term "organolithium compounds" is any organolithium compound responding to the formula R-Li where R is an alkyl, alkaryl, arylalkyl or aryl group. Representative among the compounds responding to the formula set forth above are ethyllithium, propyllithium, n-, sec- or t-butyllithium, hexyllithium, styryllithium or phenyllithium. Also, the organolithiumaluminum compounds may be used. These compounds respond to the formula $R'R''_3LiAl$ where R' and R'' may be alkyl, alkaryl or arylalkyl groups and R' and R'' may or may not be the same group. Representative of these compounds are n - butyltriisobutyllithium aluminum, tetrabutyllithium aluminum, butyltriethyllithium aluminum and tetraisobutyllithium aluminum.

Representative of other organometallic compounds with metals selected from Groups I, II and III of the Periodic System are compounds containing at least one of the metals, sodium, potassium, calcium, beryllium, cadmium and mercury combined with at least one organic radical selected from the group consisting of alkyls, alkaryls, arylalkyls, and aryls.

The second component of the catalyst system of this invention is an organometallic compound which contains nickel and/or cobalt. The compound may be any organonickel compound or any organocobalt compound. It is preferred to employ soluble compounds of nickel and/or cobalt. These soluble compounds of nickel and/or cobalt are usually compounds of the said metals with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any nickel salt and/or cobalt salt of an organic acid, containing from about 1 to 20 carbon atoms may be employed.

Representative of such organonickel compounds are nickel benzoate, nickel acetate, nickel naphthenate, bis (alpha furyl dioxime) nickel, nickel octanoate, nickel palmitate, nickel stearate, nickel acetylacetonate, bis (salicylaldehyde) ethylene diimine nickel and nickel salicylaldehyde. Nickel tetracarbonyl also may be employed as the nickel containing catalyst in this invention. The preferred component containing nickel is a nickel salt of a carboxylic acid or an organic complex compound of nickel.

Representative of such organocobalt compounds are cobalt benzoate, cobalt acetate, cobalt naphthenate, bis (alpha furyl dioxime) cobalt, cobalt octanoate, cobalt palmitate, cobalt stearate, cobalt acetylacetonate, bis (salicylaldehyde ethylene diimine) cobalt and cobalt salicylaldehyde. Dicobalt octacarbonyl also may be employed as the cobalt containing catalyst in this invention. The preferred component containing cobalt is a cobalt salt of a carboxylic acid or an organic complex compound of cobalt.

The third component of the catalyst system is a trialkyltin fluoride compound. These trialkyltin fluoride compounds may be defined by the formula $R_3SnF$ wherein R is an alkyl radical containing from 1 to about 20 carbon atoms. Representative of such trialkyltin fluorides are trimethyltin fluoride, triethyltin fluoride, tripropyltin fluoride, tributyltin fluoride, trihexyltin fluoride, dibutylhexyltin fluoride, butyldihexyltin fluoride and the like. The preferred trialkyltin fluoride is tributyltin fluoride.

The three component catalyst system of the present invention has shown polymerization activity only within certain well-defined limits of catalyst concentrations and mole ratios of the catalyst components to each other. For example, when the catalyst, composed of triethyl aluminum/nickel octanoate/tributyltin fluoride, is employed, it has been observed that polymerization will not occur if the mole ratio of the triethyl aluminum to the tributyltin fluoride is equal to or greater than 1. Also, it has been observed that the two component system, nickel octanoate and tributyltin fluoride, will not promote the polymerization alone. Therefore, it is of necessity that some reducing agent, particularly an organometallic compound of Groups I, II and III metal, must be employed.

Therefore, it can be said that the mole ratio of the trialkyltin fluoride compound (F) to the organometallic compound (Me), where the metal is from Groups I, II or III, must vary between 1/1 and 25/1 and the mole ratio of the trialkyltin fluoride to the nickel compound (Ni) must vary between about 1/1 and about 500/1 and the mole ratio of the organometallic compound, where the metal is from Groups I, II and III, and the nickel compound must vary between about 0.3/1 and about 300/1. The preferred F/Me mole ratio varies between 1.2/1 and 5/1. The preferred F/Ni mole ratio may vary between 5/1 and 200/1. The preferred Me/Ni mole ratio should vary between 1/1 and 80/1.

When organocobalt compounds replace organonickel compounds or mixture of organonickel and organocobalt are used as the second catalyst component in the ternary system of this invention, the mole ratio of cobalt (Co) and/or nickel (Ni) to the other catalyst components are similar to those of nickel (Ni) shown above.

The three catalyst components may be charged to the polymerization system as separate catalyst components in either a stepwise or a simultaneous manner, sometimes called "in situ." The catalyst may also be "preformed"

outside the polymerization system whereby all the catalyst components are mixed in the absence of the butadiene, either with or without an inert diluent and the complete blend then added to the polymerization system.

An improved preformed catalyst system can be prepared by having a small amount of a diolefin, for example, butadiene or isoprene, present when the catalyst components are mixed together. The diolefin apparently reacts with the catalyst components to form a catalyst complex which is more active, particularly when the polymerization system contains impurities, than either the in situ catalyst (which is prepared in the presence of a very large amount of monomer) or the simple preformed catalyst prepared in the absence of the diolefin. The improved preformed catalyst may be prepared by dissolving a small amount of diolefin in a hydrocarbon solvent such as benzene or hexane, and then adding the organometallic reducing component, the nickel component and then the trialkyltin fluoride component to the solvent.

The particular order of adidtion may be varied somewhat but it is advantageous to have (1) the diolefin present before the addition of both organometallic reducing and the nickel components or (2) the Ni component present before the addition of both the reducing and trialkyltin fluoride catalyst components. The amount of the diolefin which can be present to form the improved preformed catalyst can be varied over a wide range, and, of course, is somewhat dependent on the other catalyst concentrations. However, the amount of diolefin, preferably butadiene, used to prepare the preformed catalyst should be between about 0.001 and 3.% of the total amount of monomer to be polymerized. Based upon catalyst mole ratios, the diolefin to the nickel mole ratio should be between about 0.5/1 and 1000/1, and preferably between about 2/1 and 100/1.

The concentration of the total catalyst system employed depends on factors such as purity of the system, polymerization rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and thus, are solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, cycloaliphatic hydrocarbons and ethers, representative of which are pentane, hexane, heptane, toluene, benzene, cyclohexane, diisopropyl ether and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, such as butane or pentane, in which the polymer formed is insoluble. It should be understood, however, that it is not intended to exclude bulk polymerizations from the scope of this application. The polymerization may be continuous or batch type.

It is usually desirable to conduct the polymerizations of this invention employing air-free and moisture-free techniques.

The temperatures employed in the practice of this invention have not been found to be critical and may vary from a low temperature such as −10° C. or below up to high temperatures of 100° C. or higher. However, a more desirable temperature range is between about 30° C. and about 90° C. Ambient pressures are usually used but higher or lower pressures may be employed.

The practice of this invention is further illustrated by reference to the following examples which are intended to be representative rather than restrictive of the scope of this invention.

EXAMPLE I

Purified butadiene in benzene solution containing 10 grams of butadiene per hundred milliliters of solution was charged to a number of 4-ounce bottles. Nitrogen was flushed over the surface of this premix while the catalyst was charged in the amounts shown in the table below. The catalyst employed was a mixture of triethylaluminum (TEAL), nickel octanoate (NiOct) and tributyltin fluoride (TBTF) and was charged by the in situ method. The bottles were tumbled end over end for one hour in a water bath maintained at 50° C. The polymerizations were deactivated by the addition to the system of an amine-type stopping agent and an antioxidant, both components being added as one part per hundred parts of original monomer charged.

The results and the amounts of catalyst are reported in the table below. Dilute solution viscosity which is a measure or an indication of the molecular weight of the polymer, is shown as DSV. The first column is the experiment number; the second column is the amount of triethylaluminum; the third column is the amount of nickel octanoate and the fourth column is the amount of tributyltin fluoride employed. These catalyst components are reported in millimoles per 100 grams of butadiene. The fifth column is the percent conversion by weight after 18 hours polymerization time. The sixth column is the dilute solution viscosity of the polymer.

| Run | TEAL | NiOct | TBTF | Yield | DSV |
|---|---|---|---|---|---|
| 1 | 0.6 | 0.05 | 1.5 | 97 | 4.2 |
| 2 | 1.0 | 0.05 | 0.75 | 0 | ---- |
| 3 | 1.0 | 0.05 | 1.50 | 41 | 3.4 |
| 4 | 1.0 | 0.05 | 2.25 | 95 | 4.3 |
| 5 | 1.0 | 0.05 | 3.00 | 76 | 4.8 |

In a run where the TEAL/NiOct/TBTF was 0.6/0.05/0.75 a conversion of 62% by weight was obtained at the end of 2 hours and the DSV of this polymer was 3.9. The microstructure of the polymer obtained in Run No. 1 was determined by conventional infrared techniques to be 98.1% cis 1,4-polybutadiene.

The data in this table indicate that when the ratio of the organometallic reducing agent exceeds that of the trialkyltin fluoride, no polymerization takes place. These data also indicate that the mole ratio of the fluoride component to the reducing agent has an affect on the molecular weight as determined by DSV. It appears that the DSV of the polymer produced increases with an increasing fluoride/reducing agent mole ratio.

EXAMPLE II

Butadiene was polymerized in a manner similar to that of Example I except that triisobutylaluminum (TIBA) was employed in Run No. 1. The amounts of catalyst employed were $R_3Al$/NiOct/TBTF of 0.6/0.05/1.5 millimoles per 100 grams of butadiene. The results are reported below.

| Run No. | Yield | | DSV | | Cis 1,4 content, 18 hours |
|---|---|---|---|---|---|
| | 2 hours | 18 hours | 2 hours | 18 hours | |
| 1 | 62 | 97 | 4.0 | 3.7 | 98.7 |
| 2 | 68 | 97 | 4.4 | 4.2 | 98.1 |

These data indicate that in the catalyst system of this invention, the selection of the reducing agent is not as limited as the prior art system.

EXAMPLE III

Butadiene was polymerized in a manner similar to that of Example II except triethylaluminum was used in both runs and the temperature of Run 1 was 50° C. and Run 2 was 70° C. The catalyst components were TEAL/NiOct/TBTF of 0.6/0.05/1.5 millimoles per 100 grams of butadiene. The results are reported below.

| Run | Temperature (°C.) | Yield, 2 hours, percent | DSV |
|---|---|---|---|
| 1 | 50 | 79 | 4.2 |
| 2 | 70 | 89 | 3.1 |

These data indicate the possibility of some control of molecular weight by the temperature of the polymerization.

While certain representative embodiments and details have been shown for the purpose of illustrating the invention, it will be apparent to those skilled in this art that various changes and modifications may be made therein without departing from the spirit or scope of the invention.

What is claimed is:

1. In the process which comprises polymerizing at least one monomer selected from the group consisting of butadiene and butadiene in combination with isoprene, by contacting said monomer, under solution polymerization conditions, with a catalyst consisting essentially of
    (1) at least one organometallic compound selected from the group consisting of organometallic compounds responding to the formulae
        (a)  $AlR_1R_2R_3$
        in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, and arylalkyl;
        (b)  $R_2Mg$
        wherein R may be alkyl, aryl, arylalkyl or alkaryl;
        (c)  $R\ MgY$
        wherein R may be alkyl, aryl, arylalkyl or alkaryl and Y is fluorine;
        (d)  $R_2Zn$
        wherein R may be alkyl, aryl, alkaryl or arylalkyl;
        (e)  $R\ Li$
        wherein R is an alkyl, alkaryl, arylalkyl or aryl;
    (2) at least one organonickel compound selected from the class consisting of nickel salts of carboxylic acids, organo complex compounds of nickel and nickel tetracarbonyl, and
    (3) a fluorine-containing compound,
the improvement which comprises employing as the fluorine-containing compound at least one trialkyltin fluoride and employing catalyst components in amounts so that the mole ratios of the organometallic compound to the organonickel compound ranges from 1/1 to 80/1, the mole ratios of the trialkyltin fluoride to the organometallic compound ranges from 1.2/1 to 5/1 and the mole ratios of the trialkyltin fluoride to the organonickel compound ranges from 5/1 to 200/1.

2. The process according to claim 1 in which the monomer is butadiene.

3. The process according to claim 1 wherein the tinalkyl fluoride is tributyltin fluoride.

4. The process according to claim 1 in which the organometallic compound is an organoaluminum compound.

5. The process according to claim 4 in which the organoaluminum compound is selected from the group consisting of trialkylaluminum and alkylaluminum hydrides.

6. The process according to claim 5 in which the nickel compound is a nickel salt of carboxylic acids.

7. The process according to claim 6 in which the nickel salt of carboxylic acids is nickel octanoate.

References Cited

UNITED STATES PATENTS

| 3,170,907 | 2/1965 | Ueda et al. | 260—94.3 |
| 3,222,348 | 12/1965 | Duck et al. | 260—94.3 |
| 3,247,175 | 4/1966 | Van Volkenburg et al. | 260—94.3 |
| 3,262,887 | 7/1966 | Calfee | 252—429 |
| 3,284,431 | 11/1966 | Gippin | 260—94.3 |

JOSEPH L. SCHOFER, Primary Examiner

J. C. HAIGHT, Assistant Examiner

U.S. Cl. X.R.

252—429, 431; 260—80.7, 94.3